(12) United States Patent
Nguyen et al.

(10) Patent No.: US 8,924,990 B2
(45) Date of Patent: Dec. 30, 2014

(54) PROVIDING OPERATION SYSTEM HISTORY

(71) Applicant: Red Hat, Inc., Raleigh, NC (US)

(72) Inventors: Filip Nguyen, Brno (CZ); Martin Vecera, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 28 days.

(21) Appl. No.: 13/755,496

(22) Filed: Jan. 31, 2013

(65) Prior Publication Data

US 2014/0215498 A1    Jul. 31, 2014

(51) Int. Cl.
- *G06F 3/00* (2006.01)
- *G06F 9/455* (2006.01)
- *G06F 9/46* (2006.01)
- *G06F 9/54* (2006.01)

(52) U.S. Cl.
CPC ........................................ *G06F 9/54* (2013.01)
USPC ................................ 719/328; 718/1; 718/108

(58) Field of Classification Search
CPC .......... G06F 17/30595; G06F 11/3058; G06F 9/4443; G06F 21/52; G06F 9/45
See application file for complete search history.

(56) References Cited

U.S. PATENT DOCUMENTS

| | | | | |
|---|---|---|---|---|
| 6,986,141 | B1 * | 1/2006 | Diepstraten et al. | 718/108 |
| 7,296,271 | B1 * | 11/2007 | Chalmer et al. | 718/108 |
| 7,418,718 | B2 * | 8/2008 | Liu et al. | 719/328 |
| 2005/0204357 | A1 * | 9/2005 | Garg et al. | 718/1 |
| 2007/0074223 | A1 * | 3/2007 | Lescouet et al. | 718/108 |
| 2009/0234856 | A1 * | 9/2009 | Miloushev et al. | 707/8 |
| 2012/0242692 | A1 * | 9/2012 | Laubach | 345/629 |

* cited by examiner

*Primary Examiner* — Tuan Dao
(74) *Attorney, Agent, or Firm* — Lowenstein Sandler LLP (57) ABSTRACT

A mechanism for providing an operating system history is disclosed. A method includes placing, by an operating system (OS) of a processing device, a pointer to context of a first application in a history context of plurality of applications in a direct interface array (DIR) of the OS upon indication of switching from an interface of a first application to the interface of a second application. The method also includes moving the pointer from the context of the first application to the context of the second application in the DIR in view of an indication of a closing of the interface of the second application. The second application is closed in a foreground of the OS and is executing in a background of the OS. The method further includes providing the interface of the second application in the foreground of the OS upon activation of a global back function.

20 Claims, 6 Drawing Sheets

PROVIDING OPERATION SYSTEM HISTORY

TECHNICAL FIELD

The embodiments of the disclosure relate generally to a computer system and, more specifically, relate to systems and methods for providing operating system history.

BACKGROUND

When a user works on a computing device, the user may use multiple various applications. As such, the user may open these applications on the interface of the computing device. Often, the user switches between the applications or even closes the applications and later returns back to the closed applications.

Currently, a contextual history (e.g., an opened application with a position in that application) and a corresponding back button are implemented by the user for individual applications. Some examples of such implementations include Visual Studio™ and Eclipse™. Visual Studio™ is a software development environment (also known as an Integrated Development Environment or IDE) used primarily by software developers to build software products, websites and utilities including their interdependencies, configurations and version control information. Eclipse™ is an extension to the Visual Studio™ that provides global preferences, windows layout, and search and navigation history.

Both Visual Studio™ and Eclipse™ provide navigate forward and navigate backward options in the IDE environment, but are extended to a specific application. None of these mechanisms function on the level of an entire operating system (OS). This is because, at the OS level, applications are heterogeneous and re-launching the applications involves knowledge at the application level.

BRIEF DESCRIPTION OF THE DRAWINGS

The disclosure is understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Embodiments of the disclosure are directed to a method and system for providing operation system history in a computer system. In some embodiments, a plurality of applications is opened in an interface of the computer system. In one embodiment, a user switches from an interface of a first application of the plurality of applications to an interface of a second application of the plurality of applications. An operating system (OS) extension module executed by the computer system may store a context of the first application in a direct interface array (DIR) of the OS in view of an indication of the switch. The DIR includes a history context of the plurality of applications. The OS extension module may then place a pointer to the context of the first application in the history context of the plurality of the applications in the DIR In other embodiments, the user closes the interface of the second application. Upon the closing of the second application by the user, the OS extension module may store a context of the second application in the DIR in view of an indication of the closing of the interface of the second application. In one embodiment, the second application is closed in a foreground of the OS while it is still executing in a background of the OS. The DIR may move the pointer from the context of the first application to the context of the second application in the history context of the plurality of the applications in the DIR.

In a further embodiment, the user activates a global back function on the processing device. In one embodiment, the OS extension module provides the interface of the second application in the foreground of the OS upon activation of the global back function.

A method of one embodiment of the disclosure includes storing by an operating system (OS) executed by a processing device, a context of a first application of a plurality of applications in a direct interface array (DIR) of the OS in view of an indication of a switching from an interface of the first application to the interface of a second application of the plurality of applications. In one embodiment, the DIR includes a history context of the plurality of applications. The method also includes placing, by the OS, a pointer to the context of the first application in the history context of the plurality of the applications in the DIR.

In addition, the method includes storing, by the OS, a context of the second application in the DIR in view of an indication of a closing of the interface of the second application, wherein the second application is closed in a foreground of the OS while it is still executing in a background of the OS. The method also includes moving, by the OS, the pointer from the context of the first application to the context of the second application in the history context of the plurality of the applications in the DIR.

The method further includes providing, by the OS, the interface of the second application in the foreground of the OS upon a first activation of a global back function.

Figure 1:
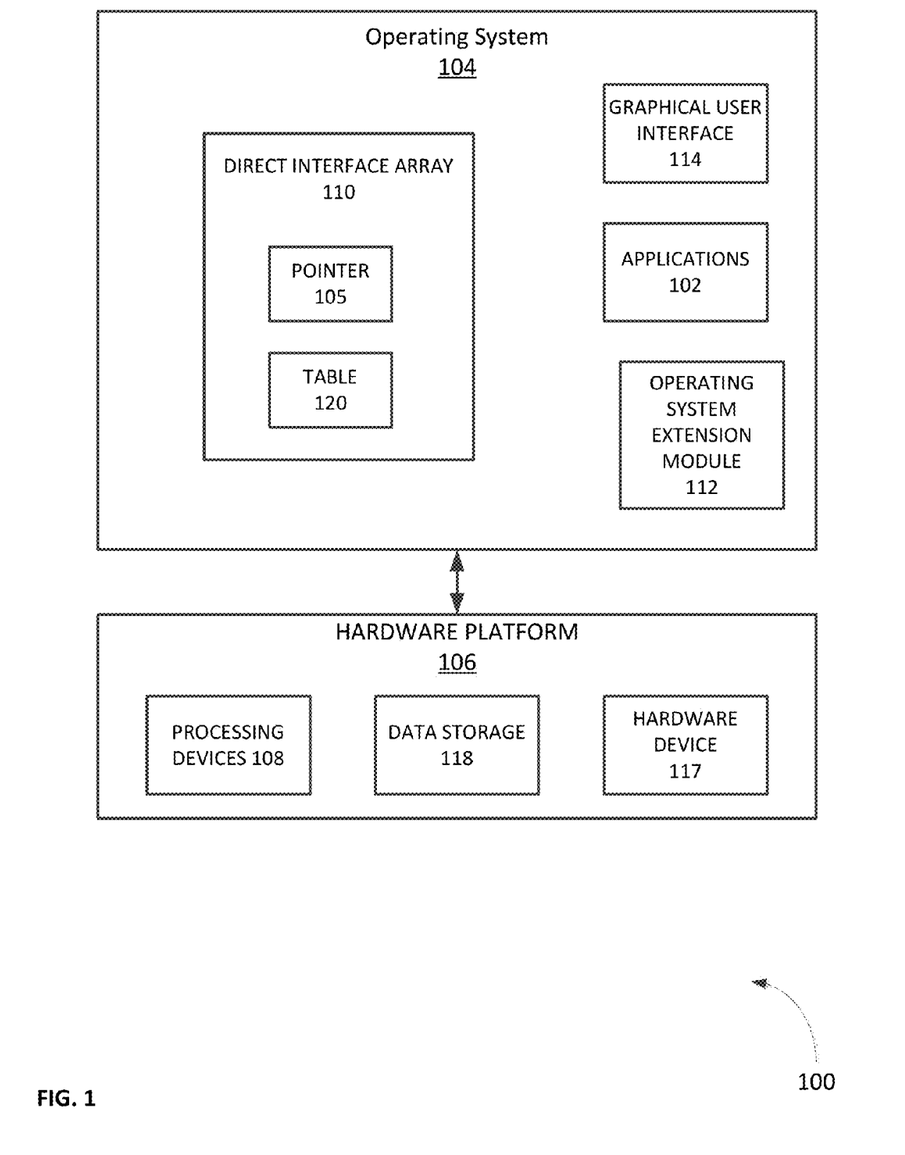
FIG. 1 is a block diagram of a computer system in which the embodiments of the present disclosure may operate.

FIG. 1 is a block diagram illustrating a computer system 100 in which embodiments of the present invention may be implemented. In one embodiment, the computer system 100 may be a machine such as, for example, any variety of end user devices, such as a personal computer (PC), a laptop, a mobile phone, mobile smart phone, a tablet computer, handheld devices, netbooks, or any other computing device. Furthermore, computer system 100 may comprise a server device. The computer system 100 comprises a hardware platform 106, on top of which runs an operating system (OS) 104. The OS 104 may include Microsoft™, Linux™, Solaris™, Mac™ OS or any other suitable OS for managing operations on the computer system 100.

The hardware platform 106 may include one or more processing devices 108 and data storage 118. In one embodiment, the data storage 118 comprises one or more hardware or software devices, which may be located internally or externally to the computer system 100. Examples of data storage 118 may include, but are not limited to, random-access memory (RAM), non-volatile storage memory (e.g., Flash, EEPROM, solid state drives (SSD), etc.), magnetic storage memory (e.g., one or more hard drives), and optical memory (e.g., CDs, DVD, BlueRay drives, etc.). In addition, hardware platform 106 may include additional hardware devices 117, such as network interface cards (NICs), sound or video adaptors, photo/video cameras, printer devices, keyboards, displays or any other suitable device intended to be coupled to a computer system.

The OS 104 may include one or more software application programs 102 (i.e. applications). The applications 102 may be any computer-executable program capable of communicating with the OS 104. Some of these applications may include, but are not limited to, Microsoft™ applications, browser applications, an Eclipse integrated development environment (IDE), and/or other applications.

The OS 104 also includes a direct interface array (DIR) 110 which is an array data structure storing a history context of the plurality of applications 102. The history context of the application may include data that provides a current state of the application. The data may include, but is not limited to, position of the cursor and position of the scrollbars.

In one embodiment, the applications 102 may be presented as opened in an interface of the computer system 100. In some embodiments, the interface is a graphical interface. In another embodiment, the applications 102 may be presented as closed in the interface of the computer system 100. An interface may be an area on the computer system 100 that provides access to the applications. In some embodiments, the DIR 110 provides a pointer 105 to a context of the application in the history context of the plurality of applications 102. In one embodiment, the pointer 105 is located at the context of the application which was the most recently visited in the plurality of the applications.

The OS 104 further includes an OS extension module 112 to provide a history context of the applications 102 in the computer system. In one embodiment, the OS extension module 112 accesses the history context of the applications 102 in the DIR 110. In another embodiment, the OS extension module 112 provides the interface of the application 102 in the DIR 110 that has the pointer to the context of the application 102. The OS 104 may also include a graphical user interface (GUI) 114 configured to provide the interface of the application 102 to the user.

In some embodiments, a user performs various functions related to the applications 102. In one embodiment, the user opens the applications 102. In another embodiment, the user closes the applications 102. In a further embodiment, the user functions to switch between the applications 102. In an even further embodiment, the user performs tasks in the application 102. Such a task may include, but is not limited to,writing of a source code to IDE and watching movies with a movie player.

In some embodiments, the user activates a global back function. The global back function provides for navigation of previously-visited applications among the applications stored in the DIR 110, beginning with the most recently-visited application and ending with the least recently visited application. In one embodiment, the global back function is activated by a global keyboard shortcut provided by the OS 104 on the computer system 100.

In some embodiments, multiple interfaces of applications are opened on the OS 104 of the computer system 100. In one embodiment, a task is performed by the user in at least one of the applications. The applications may include at least a first application, a second application and a third application.

In some embodiments, a user switches from an interface of the first application to the interface of the second application. In some embodiments, upon the switch, the OS extension module 112 stores the context of the first application into the history context of the applications in the DIR 110. In other embodiments, the OS extension module 112 places the pointer 105 to the context of the first application to the head of the history context in the DIR 110.

The user may then close the interface of the second application. In some embodiments, upon the closing of the interface of the second application, the OS extension module 112 stores the context of the second application into the history context of the applications in the DIR 110. In one embodiment, the second application is closed in a foreground of the OS 104 of computer system but is actively processing in the background of the OS 104 of the computer system. In other embodiments, the OS extension module 112 moves the pointer 105 from the context of the first application to the context of the second application 302 and places it to the head of the history context in the DIR 110.

In some embodiments, the user navigates to the interface of the third application. In other embodiments, the user activates the global back function when associated in the interface of the third application. In one embodiment, the global back function is activated by a global keyboard shortcut provided by the OS 104 on the computer system 100.

In some embodiments, upon activation of the global back function, the OS extension module 110 searches the history context to locate the pointer 105 in the DIR 110. In other embodiments, the OS extension module 110 provides the interface of the second application on the computer system. As such, the second application, which was previously closed in the foreground of the OS 104 of the computer system yet actively processing in the background of the OS 104 of the computer system, now, appears in the foreground of the OS 104 of the computer system.

In some embodiments, the user activates the global back function again when present in the interface of the second application. In some embodiments, the OS extension module 110 searches the history context to locate the pointer 105 in the DIR 110 upon another activation of the global back function. Upon activation of the global back function, the OS extension module 112 may then provide the interface of the first application on the computer system.

Figure 2:
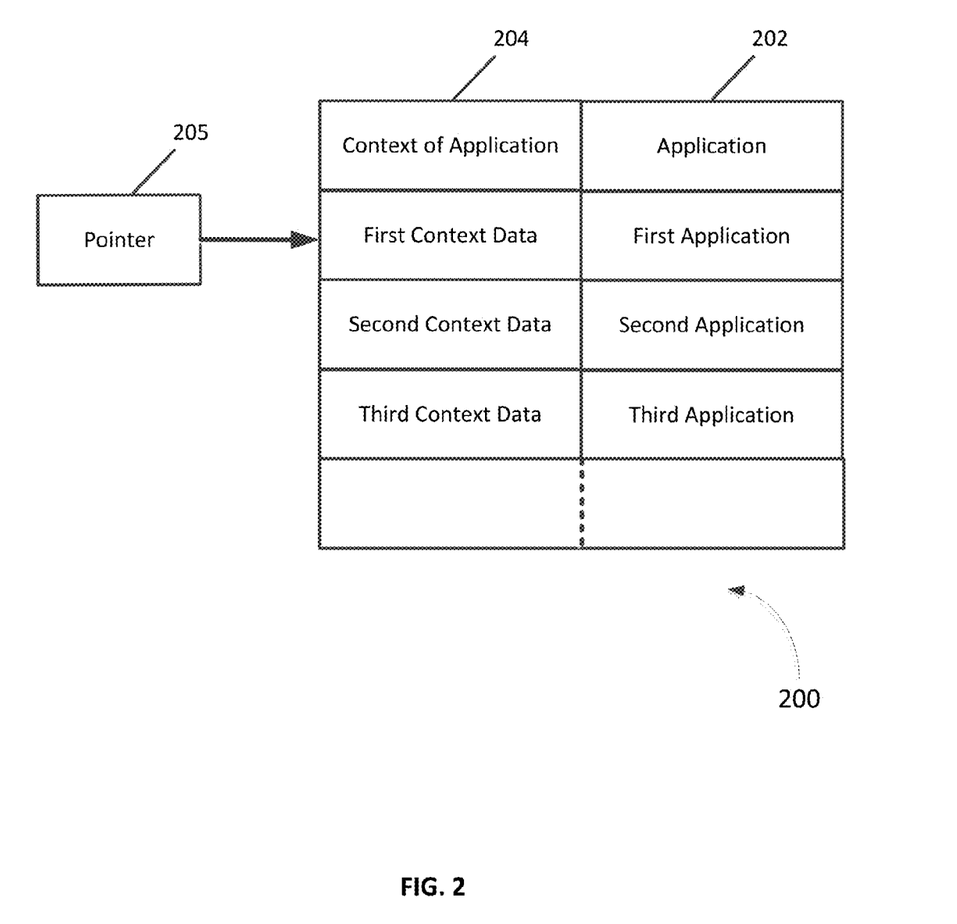
FIG. 2 illustrates an example of a table of a Direct Interface Array of a computer system in accordance with some embodiments.

FIG. 2 illustrates an example of a table 200 of history context stored in the DIR 110 of an operating system according to embodiments of the disclosure. In one embodiment table 200 is the same table 120 as depicted as part of the DIR 110 in FIG. 1. In other embodiment, table 200 includes applications 202 and context 204 of applications associated with the applications 202. Some types of applications include a first application, a second application and a third application. Some types of context 202 of application include a first context data associated with the first application, a second context data associated with the second application and a third context data associated with the third application.

In one embodiment, the applications 202 are same as the applications 102 of FIG. 1. As discussed above, some of these applications may include, but are not limited to, Microsoft™ applications, browser applications, an Eclipse integrated development environment (IDE), and/or other applications. In other embodiment, the context 204 of the applications 202 includes data that provides a current state of the application. The data may include, but is not limited to, position of the cursor and position of the scrollbars.

In some embodiments, a pointer 205 is provided located at a context of the application in the history context of the plurality of applications 202. In one embodiment, the pointer 205 is the same pointer 105 as depicted as part of the DIR 110 in FIG. 1. In some embodiments, the pointer 205 is located at the context of the application which was the most recently visited in the plurality of the applications 202. As an example, the pointer 205 is located at the first content data associated with the first application indicating the first application as the most recently visited application among the plurality of applications 202.

Figure 3:
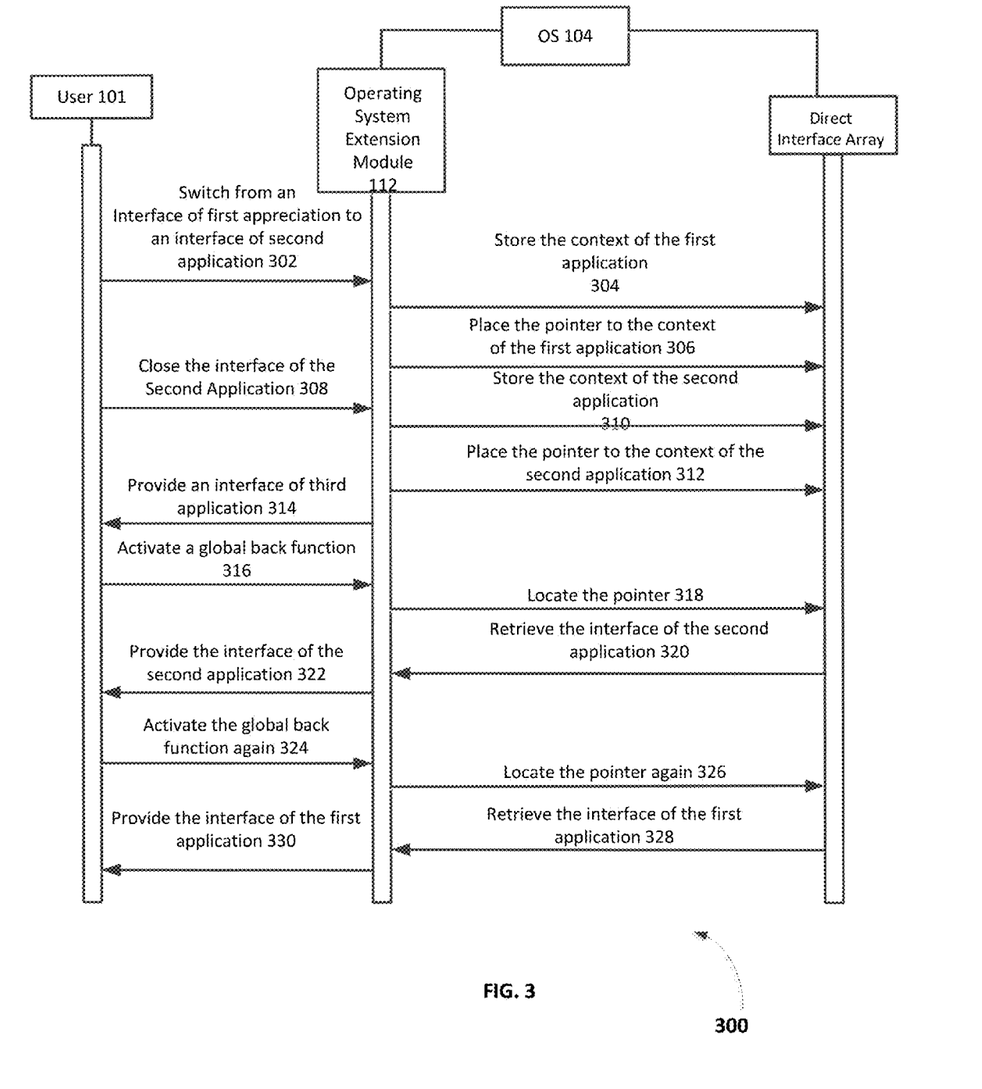
FIG. 3 illustrates an example of interactions between a user, and an operation system in accordance with some embodiments.

FIG. 3 is a communication flow diagram depicting interactions between a user 101 and an OS 104 according to an embodiment of the disclosure. In one embodiment, the user 101 and the OS 104 are the same components as described with respect to FIG. 1.

In one embodiment user 101 switches 302 from an interface of a first application to an interface of a second application. As discussed above, the application may be any computer-executable program capable of communicating with the OS 104. The application may include, but is not limited to, Microsoft™ application, browser application, Eclipse integrated development environment (IDE), and/or other applications. The OS extension module 112 may store 304 the context of the first application in the DIR 110. The OS extension module 112 may also place 306 the pointer to the context of the first application in the DIR 110.

In another embodiment, the user 101 closes 308 the interface of the second application. Subsequently, the OS extension module 112 may store 310 the context of the second application in the DIR 110. The OS extension module 112 may also place 312 the pointer to the context of the second application in the DIR 110. In one embodiment, the OS extension module 112 provides 314 the interface of the third application to the user 101.

In another embodiment, the user 101 activates a global back function 316. The OS extension module 112 may locate 318 the pointer in the DIR 110. In response, the OS extension module 112 may retrieve 320 the interface of the second application and provide 322 the interface of the second application to the user 101.

In a further embodiment, the user 101 again activates 324 the global back function. The OS extension module 112 may locate 326 the pointer in the DIR 110. The OS extension module 112 may retrieve 328 the interface of the first application. The OS extension module 112 may provide 330 the interface of the first application to the user 101.

Figure 4A:
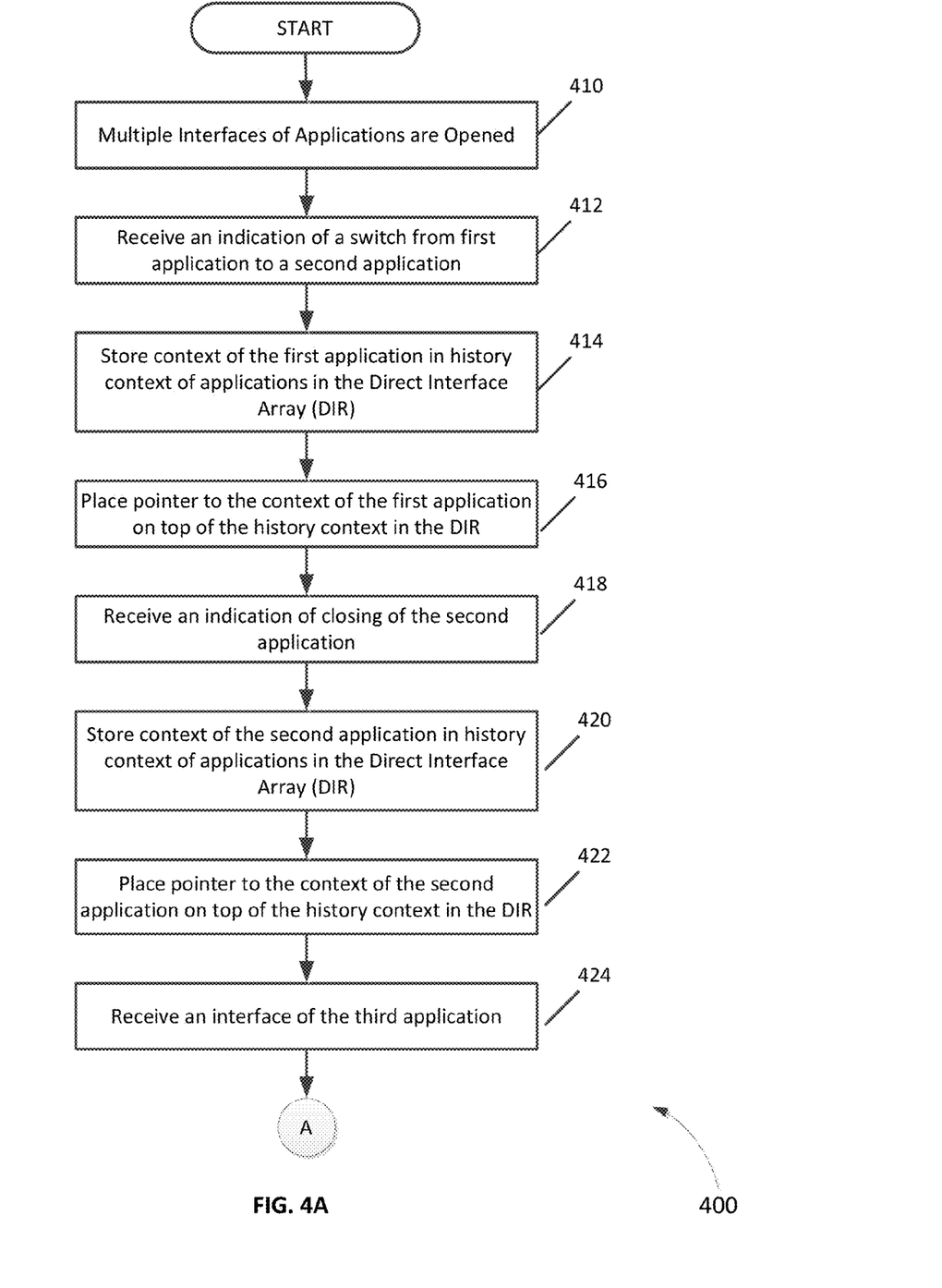
FIGS. 4A and 4B are flow diagrams of one embodiment of a method for providing operating system history.
Figure 4B:
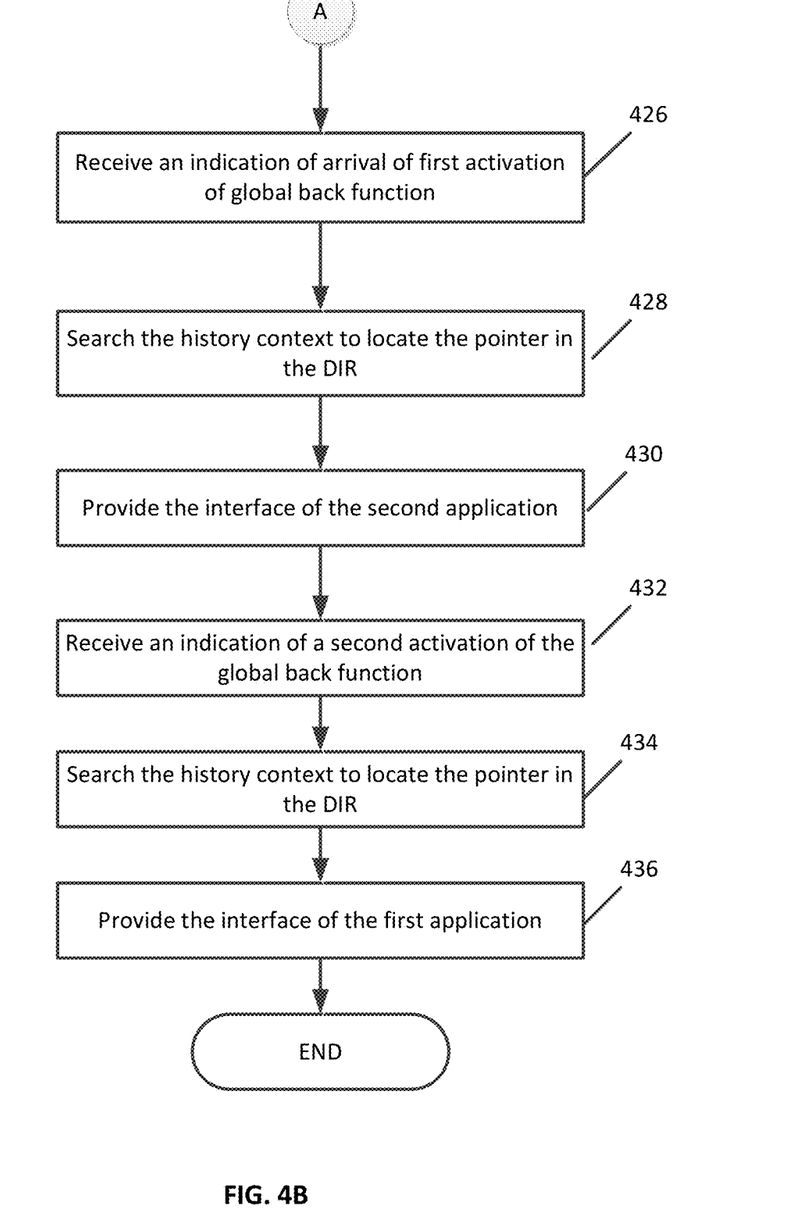

FIGS. 4A and 4B are flow diagrams illustrating a method 400 for providing operating system history according to an embodiment of the disclosure. Method 400 may be performed by processing logic that may comprise hardware (e.g., circuitry, dedicated logic, programmable logic, microcode, etc.), software (such as instructions run on a processing device), firmware, or a combination thereof. In one embodiment, method 400 is performed by the OS extension module 112 of FIG. 1 executing in a computing device, such as the computer system 100 of FIG. 1.

Method 400 begins at block 410 where multiple interfaces of applications are component of the computing device that provides access to the applications. In some embodiments, the interface is a graphical interface. Also, as discussed above, some of these applications may include, but are not limited to, Microsoft™ applications, browser applications, Eclipse integrated development environment (IDE), and/or other applications.

At block 412, an indication of a switch from interface of the first application to the interface of the second application is received at the OS 104. In one embodiment, the interfaces of the applications are switched by the user. In one embodiment, a task is performed by the user in the first application prior to the switching from the first application to the second application. As discussed above, the task may include, but is not limited to, writing of a source code to IDE and watching movies with a movie player.

At block 414, the OS extension module 112 stores context of the first application into a history context of the applications in the DIR 110. The context of the application includes data that provides a current state of the application. Some of the data may include, but is not limited to position of the cursor and position of the scroolbars. At block 416, the OS extension module 112 places the pointer to the context of the first application on top of the history context in the DIR 110.

At block 418, an indication of a closing of the interface of the second application 404 is received at the OS 104. In one embodiment, the interface of the second application is closed by the user. In one embodiment, a task is performed by the user in the second application prior to the closing of the interface of the second application.

At block 420, the OS extension module 112 stores context of the second application into the history context of the applications in the DIR 110. As such, the second application is not closed, but instead not shown on the interface of the computing device. In addition, a context of the second application may be placed into the DIR 110. The second application is closed in the foreground of the operating system of the computing device so it appears closed to the user, but is actually executing in a background of the operating system of the computing device. At block 422, the OS extension module 112 moves the pointer from the context of the first application to the context of the second application and placed it to the head of the history context in the DIR 110.

At block 424, the interface of a third application is received at the OS 104. In some embodiments, the OS extension module 112 provides the interface of the third application to the user. In one embodiment, the user executes an action to navigate to the interface of the third application. In another embodiment, the interface of the third application is provided upon closing of the interface of the second application. In one embodiment, a task is performed by the user in the third application.

At block 426, an indication of a first activation of global back function is received at the OS 104. As discussed above, the global back function is navigation of previously visited applications beginning with the most recently visited application and ending with the least recently visited application. In one embodiment, the global back function is activated by a global keyboard shortcut provided on the computing device. In one embodiment, the global keyboard shortcut is activated by the user.

At block 428, the OS extension module 112 searches a history context to locate the pointer in the DIR 110. Because the last-visited application is the second application, the pointer is associated with the context of the second application. At block 430, the OS extension module 112 provides the interface of the second application on the computing device. As such, the second application, which was previously closed in the foreground of the operating system of the computing device yet actively processing in the background of the operating system of the computing device, now appears in the foreground of the operating system of the computing device.

At block 432, a second indication of the global back function is received at the OS 104. At block 434, the OS extension module 112 searches the history context to locate the pointer in the DIR 110. Because the least recently visited application is now the first application, the pointer is now associated with the context of the first application. At block 436, the OS extension module 112 provides the interface of the first application on the computing device.

Figure 5:
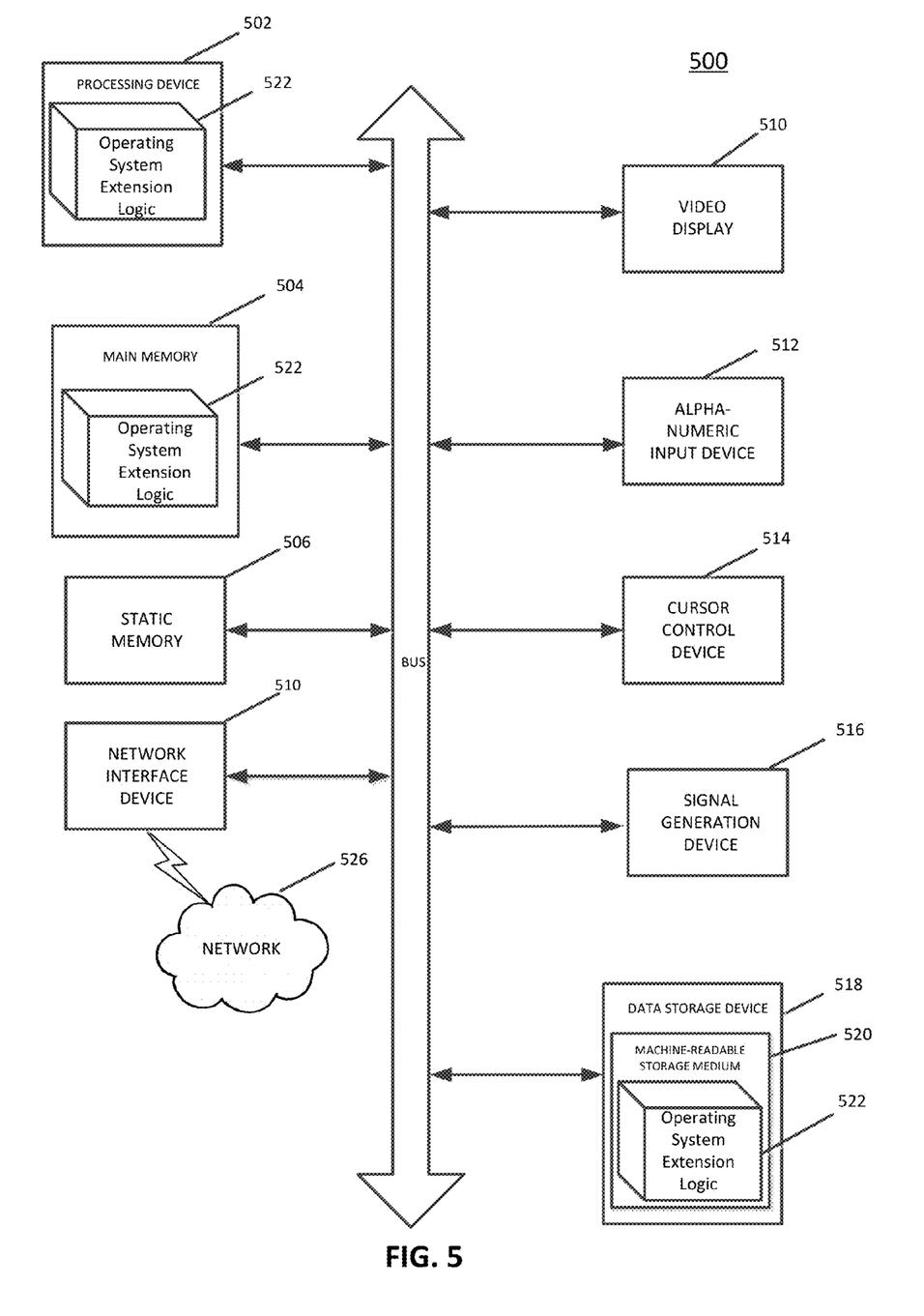
FIG. 5 illustrates a block diagram of one embodiment of a computer system.

FIG. 5 illustrates a diagrammatic representation of a machine in the example form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a memory 504 (e.g., read-only memory (ROM), flash memory, dynamic random access memory (DRAM) (such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute operating system extension logic 522 for performing the operations and steps discussed herein. In one embodiment, operating system extension module 112 described with respect to FIG. 1 performs the operating system extension logic 522.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium (or more specifically a computer-readable storage medium) 520 on which is stored one or more sets of instructions (e.g. operating system extension logic 522) embodying any one or more of the methodologies of functions described herein, such as method 400 for providing operating system history described with respect to FIGS. 4A and 4B. The operating system extension logic 522 may also reside, completely or at least partially, within the memory 506 and/or within the processing device 502 during execution thereof by the computer system 500; the memory 506 and the processing device 502 also constituting machine-accessible storage media.

The machine-readable storage medium 520 may also be used to store the operating system extension processing logic 522 persistently containing methods that call the above applications. While the machine-readable storage medium 520 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

In the foregoing description, numerous details are set forth. It should be apparent, however, that the disclosure may be practiced without these specific details. In some instances, structures and devices are shown in block diagram form, rather than in detail, in order to avoid obscuring the disclosure.

Some portions of the detailed descriptions which follow are presented in terms of algorithms and symbolic representations of operations on data bits within a computer memory. These algorithmic descriptions and representations are the means used by those well-known in the data processing arts to most effectively convey the substance of their work to others well-known in the art. An algorithm is here, and generally, conceived to be a self-consistent sequence of steps leading to a desired result. The steps are those requiring physical manipulations of physical quantities. Usually, though not typically, these quantities take the form of electrical or magnetic signals capable of being stored, transferred, combined, compared, and otherwise manipulated. It has proven convenient at times, typically for reasons of common usage, to refer to these signals as bits, values, elements, symbols, characters, terms, numbers, or the like.

It should be borne in mind, however that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", 'storing", "placing", "moving", "providing", "rendering" "displaying" or the like, refer to the action and processes of a computer system, or similar electronic computing device that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be constructed for the specific purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct an apparatus to perform the method steps. The structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

It is to be understood that the above description is intended to be illustrative, and not restrictive. Many other embodiments will be apparent to those well-known in the art upon reading and understanding the above description. Although the disclosure has been described with reference to specific examples of embodiments, it will be recognized that the disclosure is not limited to the embodiments described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method comprising:
   placing, by an operating system (OS) executed by a processing device, a pointer to a context of a first application in a history context of a plurality of the applications in a direct interface array (DIR) of the OS in view of an indication of a switch from an interface of the first application to an interface of a second application of the plurality of applications;
   storing, by the OS, a context of the second application in the DIR in view of an indication of a closing of the interface of the second application, wherein the second application is closed in a foreground of the OS and is executing in a background of the OS;
   moving, by the OS, the pointer from the context of the first application to the context of the second application in the history context of the DIR; and
   providing, by the OS, the interface of the second application in the foreground of the OS upon a first activation of a global back function.

2. The method of claim 1 wherein the context of the application comprises data of a current state of the application.

3. The method of claim 1, further comprising providing the interface of a third application of the plurality of applications in view of the indication of the closing of the interface of the second application.

4. The method of claim 1, wherein the providing the interface of the second application comprises searching the pointer in the history context of the DIR.

5. The method of claim 1 wherein the global back function enables navigation of previously-visited applications in the plurality of applications in the DIR beginning with a most recently visited application in the plurality of applications and ending with a least recently visited application in the plurality of applications.

6. The method of claim 5, further comprising providing the interface of the first application in view of a second activation of the global back function.

7. The method of claim 1, further comprising storing the context of the first application in the DIR in the view of the indication of the switch from the interface of the first application to the interface of the second application.

8. A system comprising:
   a memory; and
   a processing device coupled to the memory to:
      place a pointer to a context of a first application in a history context of a plurality of the applications in a direct interface array (DIR) of the OS in view of an indication of a switching from an interface of the first application to the interface of a second application of the plurality of applications;
      store a context of the second application in the DIR in view of an indication of a closing of the interface of the second application, wherein the second application is closed in a foreground of the OS and is executing in a background of the OS;
      move the pointer from the context of the first application to the context of the second application in the history context of the plurality of the applications in the DIR; and
      provide the interface of the second application in the foreground of the OS upon a first activation of a global back function.

9. The system of claim 8 wherein the context of the application comprises data of a current state of the application.

10. The system of claim 8 the processing device to provide the interface of a third application of the plurality of applications in view of the indication of the closing of the interface of the second application.

11. The system of claim 8, the processing device to provide the interface of the second application further comprises the OS extension module to search the pointer in the history context of the plurality of applications in the DIR.

12. The system of claim 8 wherein the global back function enables navigation of previously-visited applications in the plurality of applications in the DIR beginning with a most recently visited application in the plurality of applications and ending with a least recently visited application in the plurality of applications.

13. The system of claim 12 the processing device to provide the interface of the first application in view of a second activation of the global back function.

14. The system of claim 8 the processing device to store the context of the first application in the DIR in the view of the indication of a switching from an interface of the first application to the interface of a second application of the plurality of applications.

15. A non-transitory machine-readable storage medium including data, when accessed by a processing device, cause the processing device to perform operations comprising:
   placing, by an operating system (OS) executed by the processing device, a pointer to a context of a first application in a history context of a plurality of the applications in a direct interface array (DIR) of the OS in view of an indication of a switch from an interface of the first application to an interface of a second application of the plurality of applications;
   storing, by the OS, a context of the second application in the DIR in view of an indication of a closing of the interface of the second application, wherein the second application is closed in a foreground of the OS and is executing in a background of the OS;

moving, by the OS, the pointer from the context of the first application to the context of the second application in the history context of the DIR; and providing, by the OS, the interface of the second application in the foreground of the OS upon a first activation of a global back function.

16. The non-transitory machine-readable storage medium of claim 15 wherein the context of the application comprises data of a current state of the application.

17. The non-transitory machine-readable storage medium of claim 15 wherein the providing the interface of the second application comprises searching the pointer in the history context of the plurality of applications in the DIR.

18. The non-transitory machine-readable storage medium of claim 15 wherein the global back function enables navigation of previously-visited applications in the plurality of applications in the DIR beginning with a most recently visited application in the plurality of applications and ending with a least recently visited application in the plurality of applications.

19. The non-transitory machine-readable storage medium of claim 18, wherein the operations further comprising providing the interface of the first application in view of a second activation of the global back function.

20. The non-transitory machine-readable storage medium of claim 15, wherein the operations further comprising storing the context of the first application in the DIR in the view of the indication of a switching from an interface of the first application to the interface of a second application of the plurality of applications.

* * * * *